(No Model.)
W. G. SCOTT.
WHEEL.
No. 360,920. Patented Apr. 12, 1887.
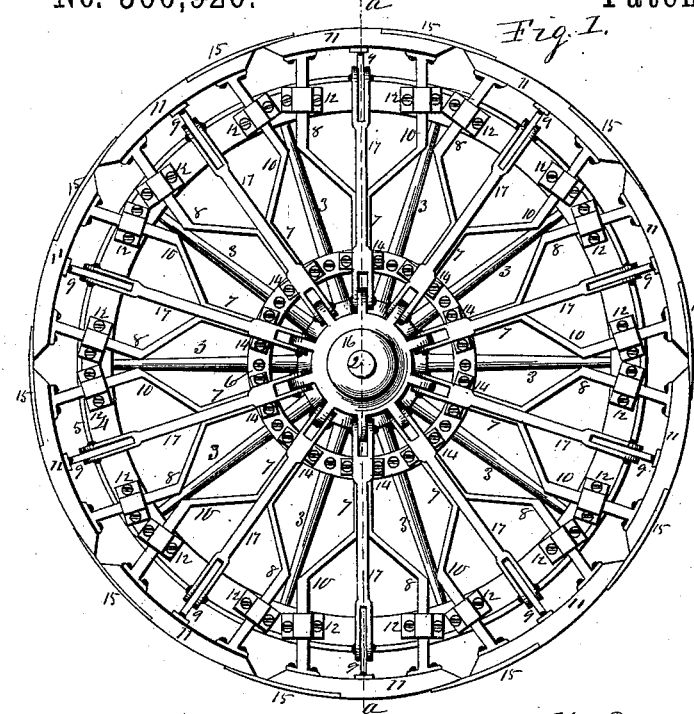
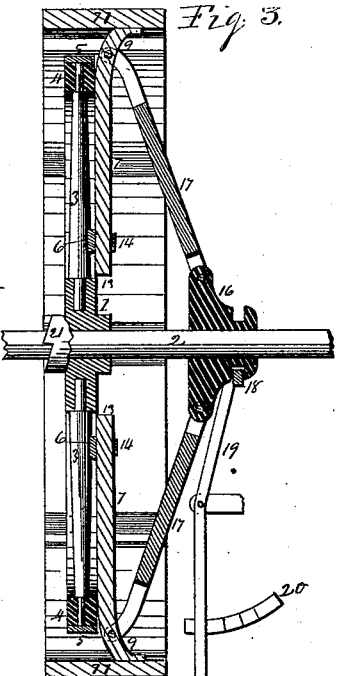
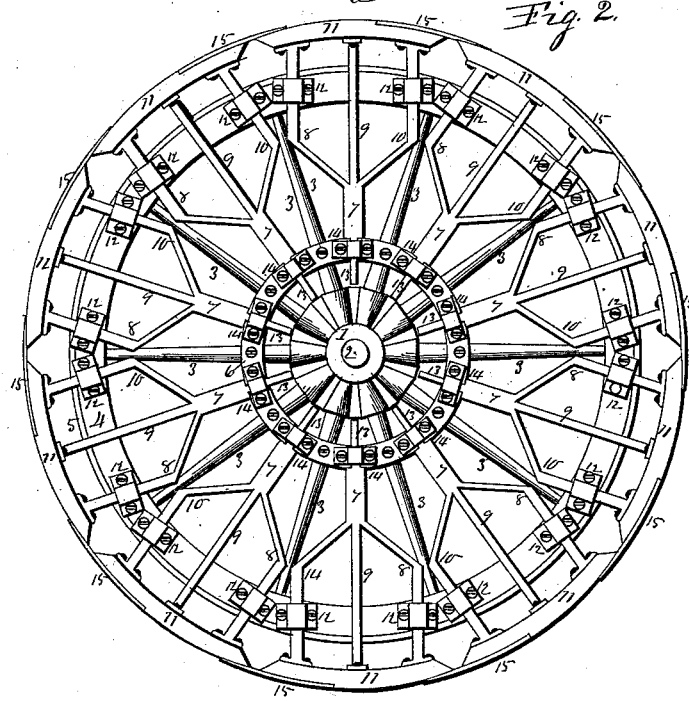
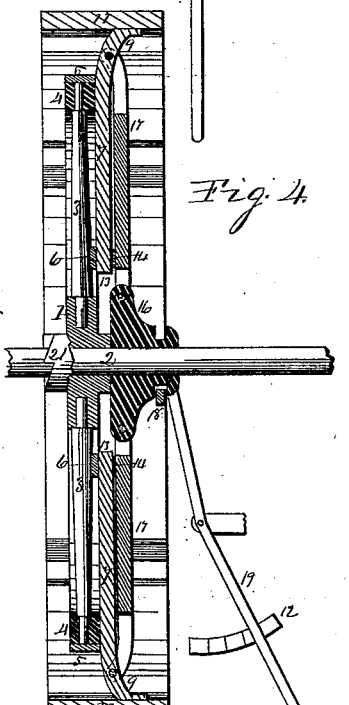
Witnesses.
B. V. Hartwell.
A. O. Behel.
Inventor
William G. Scott
Per Jacob Behel
Atty.

UNITED STATES PATENT OFFICE.

WILLIAM G. SCOTT, OF ROCHESTER, MINNESOTA.

WHEEL.

SPECIFICATION forming part of Letters Patent No. 360,920, dated April 12, 1887.

Application filed October 20, 1886. Serial No. 216,769. (No model.)

*To all whom it may concern:*

Be it known that I, WILLIAM G. SCOTT, a citizen of the United States, residing at Rochester, in the county of Olmstead and State of Minnesota, have invented a new and useful Wheel, of which the following is a specification.

This invention relates to a class of wheels known as "expanding wheels." Its object is to produce a wheel of its class capable of being readily expanded or contracted to vary its diameter, and consequently its circumference; and it consists, essentially, in a sectional rim and joint overlaps, radial spokes connected with the sections of the rim, and capable of an endwise radial movement, and means to move the radial spokes endwise on their radial lines, all of which and other necessary parts to produce a complete wheel are represented in the accompanying drawings, and will be hereinafter more fully described.

In the drawings, Figure 1 is a side elevation of a wheel embodying my invention. Fig. 2 is a side elevation of my improved wheel in which the expanding mechanism is omitted. Fig. 3 is a central section on dotted line *a* on Fig. 1, in which the rim of the wheel is contracted. Fig. 4 is a central section on dotted line *a* on Fig. 1, in which the rim of the wheel is expanded.

A hub, 1, bored to receive a shaft or axle-arm, 2, is filled with radial spokes 3, which receive a rim or felly, 4, bound by a tire, 5, to fix the parts in place and form an inner wheel. An annular rim, 6, is fixed to the radial spokes 3, concentric to the axial center of the wheel.

Tri-armed spokes 7 have the outer ends of their three branches 8, 9, and 10 fixed to the inner face of the fellies or sections 11 of the peripheral rim of the wheel 1. The outer arms, 8 and 10, of the tri-armed spokes 7 are supported to move endwise in guides 12 on the side face of the rim of the inner wheel, and the inner end, 13, of the tri-armed spoke is supported to move endwise radially in guides 14 on the annular rim 6 on the inner wheel. In this construction the outward movement of the tri-armed spokes will cause the sections of fellies to move outward and enlarge the diameter and circumference of the wheel, and the reverse or inward movement of the tri-armed spokes will contract the fellies and reduce the wheel in its diameter and circumference.

An overlap, 15, is fixed to the peripheral face of one end of each felly in the rim of the wheel, and its free end overlaps the end of the contiguous felly to permit the contraction and expansion of the peripheral rim and produce an unbroken peripheral surface. A hub, 16, is bored to receive the shaft 2 of the wheel, to slide endwise thereon.

Radial link-spokes 17 are pivotally connected at their outer ends to the central arm, 9, of the tri-armed spokes, and their inner ends are pivot-jointed to the hub 16, forming a toggle-joint connection of the tri-armed spokes and the hub to expand and contract the peripheral rim of the wheel as the hub is moved on its shaft-support to or from the wheel. An annular groove is formed in the projecting end of the sliding hub, and a yoke, 18, is placed in the annular groove.

A shifting-lever, 19, having a suitable fulcrum-support, is pivot-jointed to the yoke in the annular groove of the hub, and is employed to shift the hub on its shaft-support to expand and contract the rim of the wheel. A ratchet, 20, in connection with the shifting-lever, serves to hold the hub in its adjusted position to control the contraction and expansion of the peripheral rim of the wheel. In this instance the hub 1 of the wheel is formed with a clutch-head, 21, to receive a clutch-head having a feather-connection with the shaft to cause the wheel to revolve with its shaft-support.

My improved expanding wheel is capable of use as a belt-pulley, to dispense with the usual loose pulley. It is also capable of use as an expanding wheel in perhaps most or all situations in which an expanding wheel would be required or could be utilized with beneficial results.

I claim as my invention—

1. The combination of an expanding wheel, a non-expanding wheel, a sectional expanding rim of greater diameter than the non-expanding wheel, joint-overlaps to the sectional rim, and radial spokes to the sectional expanding rim, said spokes having a slide-connection with the non-expanding wheel, substantially as and for the purpose set forth.

2. The combination of an expanding wheel, a non-expanding wheel, a sectional expanding rim of greater diameter than the non-expanding wheel, joint-overlaps to the sectional rim, and tri-armed radial spokes, said spokes fixed to their respective sections of the expanding rim and having a slide-connection with the non-expanding wheel, substantially as and for the purpose set forth.

3. The combination, with a non-expanding wheel and a sectional rim, of tri-armed radial spokes attached to the rim-sections and having a sliding movement in suitable guides to the non-expanding wheel, and means for sliding the said radial spokes, substantially as set forth.

4. The combination, with the tri-armed radial spokes of the expanding rim, and with axial shaft-support of the wheel, of a hub to slide on the axial shaft and radial link pivoted to the hub and to the central arm of the tri-armed radial spokes, substantially as and for the purpose set forth.

5. The combination, with a non-expanding wheel and a sectional rim exterior to the rim of the non-expanding wheel, of tri-armed radial spokes fixed to the rim-sections and secured to the non-expanding wheel in sliding adjustment, a sliding hub on the axial shaft of the non-expanding wheel, links connecting the sliding hub and the tri-armed spokes, and means for sliding the hub on the shaft, substantially as set forth.

6. The combination of an expanding wheel, a sectional rim, and joint-overlaps, substantially as and for the purpose set forth.

WILLIAM G. SCOTT.

Witnesses:
ROB. POLLOCK,
B. HACKETT.